(12) United States Patent
Lim

(10) Patent No.: US 12,356,360 B2
(45) Date of Patent: Jul. 8, 2025

(54) UWB ANCHOR DEVICE FOR VEHICLE, UWB COMMUNICATION SYSTEM FOR VEHICLE AND METHOD FOR ADJUSTING RECEIVING WINDOW OF UWB ANCHOR DEVICE

(71) Applicant: HYUNDAI MOBIS Co., Ltd., Seoul (KR)

(72) Inventor: Jong Chul Lim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 370 days.

(21) Appl. No.: 17/901,205

(22) Filed: Sep. 1, 2022

(65) Prior Publication Data

US 2023/0209493 A1 Jun. 29, 2023

(30) Foreign Application Priority Data

Dec. 28, 2021 (KR) .......................... 10-2021-0190333

(51) Int. Cl.
*H04W 64/00* (2009.01)
(52) U.S. Cl.
CPC .................................. *H04W 64/00* (2013.01)
(58) Field of Classification Search
CPC ....... H04W 64/00; H04W 4/80; H04W 4/025; G01S 13/765; G01S 2013/9316; G01S 2013/9329; G01S 5/021; G01S 13/0209; H04B 1/7163; H04B 2201/71634; Y02D 30/70; G07C 9/00182
See application file for complete search history.

(56) References Cited

U.S. PATENT DOCUMENTS

| | | | |
|---|---|---|---|
| 2008/0310384 A1* | 12/2008 | Shim | G01S 13/765 |
| | | | 370/342 |
| 2020/0366335 A1 | 11/2020 | Lee et al. | |
| 2021/0250061 A1 | 8/2021 | Yoon et al. | |
| 2022/0385333 A1* | 12/2022 | Yoon | G01S 13/76 |

OTHER PUBLICATIONS

Extended European search report issued on May 15, 2023, in counterpart European Patent Application No. 22196828.2 (8 pages in English).

* cited by examiner

*Primary Examiner* — Marisol Figueroa
(74) *Attorney, Agent, or Firm* — NSIP Law

(57) ABSTRACT

A method for an ultra-wide band (UWB) anchor device for adjusting a receiving window for waiting to receive a message transmitted from a user terminal to perform UWB ranging. The method includes setting a length of the receiving window to an initial value, counting a number of reception failures of the message until the message is received, and performing the UWB ranging based on the length of the receiving window being set to the initial value or adjusting the initial value, based on the number of reception failures.

15 Claims, 6 Drawing Sheets

UWB ANCHOR DEVICE FOR VEHICLE, UWB COMMUNICATION SYSTEM FOR VEHICLE AND METHOD FOR ADJUSTING RECEIVING WINDOW OF UWB ANCHOR DEVICE

CROSS-REFERENCE TO RELATED APPLICATIONS

This application claims the benefit of the Korean Patent Application No. 10-2021-0190333 filed on Dec. 28, 2021, which is hereby incorporated by reference as if fully set forth herein.

BACKGROUND

Field of the Invention

The present invention relates to a technology for improving ultra-wide band (UWB) ranging performance based on UWB communication for a vehicle.

Discussion of the Related Art

Recently, interest in smart keys for vehicles based on UWB communication has increased. UWB communication technology calculates a distance between communication subjects by multiplying a signal arrival time between the communication subjects by a speed of light by utilizing time of flight (ToF) technology of signals having a UWB (6-8 GHz, 500 MHz or higher bandwidth).

In order to implement a UWB communication-based vehicle smart key, a plurality of UWB anchors that perform UWB communication with a user's smart key (e.g., a smartphone) are installed in a vehicle. At this time, if the smartphone and the UWB anchor (UWB device) are separated from each other with a vehicle body therebetween, for example, when the smartphone is located at the front of the vehicle and the UWB anchor is installed in a rear bumper of the vehicle, the vehicle body formed of a metal component may act as an obstacle to interfere with UWB communication, increasing a possibility of failure of UWB ranging.

If failure of UWB ranging is repeated, a time deviation due to a CLK error between the smartphone and the UWB anchor may be accumulated, and due to this, even if the smartphone enters a UWB communication area surrounding the vehicle after the lapse of a certain period of time, UWB ranging may not be successfully performed and only power may be consumed (wasted).

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present invention is directed to providing a device and method for adjusting a receiving window of a USB anchor according to the number of failures of UWB ranging to increase a probability of success of UWB ranging, while reducing power consumption according to UWB ranging.

In one general aspect, a method for an ultra-wide band (UWB) anchor device for adjusting a receiving window for waiting to receive a message transmitted from a user terminal to perform UWB ranging includes setting a length of the receiving window to an initial value, counting a number of reception failures of the message until the message is received, and performing the UWB ranging based on the length of the receiving window being set to the initial value or adjusting the initial value, based on the number of reception failures.

Counting the number of reception failures of the message may include counting a number of reception failures of a ranging control message (RCM) for setting a ranging parameter for starting the UWB ranging.

Adjusting the initial value based on the number of reception failures may include increasing the initial value in proportion to the number of reception failures.

The receiving window may include a previous time period and a subsequent time period based on an expected reception time of the message, and adjusting the initial value based on the number of reception failures may include increasing initial values of the previous time period and the subsequent time period in proportion to the number of reception failures.

Adjusting the initial value based on the number of reception failures may include comparing a variable value indicating the number of reception failures with a plurality of reference values by stages and increasing the initial value by stages.

Adjusting the initial value based on the number of reception failures may include: increasing the initial value to a first value in a case in which the variable value is greater than a first reference value X and equal to or less than a second reference value Y; and increasing the initial value to a second value greater than the first value in a case in which the variable value is greater than the second reference value Y and equal to or less than a third reference value Z greater than the second reference value Y.

The method may include performing the UWB ranging by performing UWB communication with the user terminal based on the receiving window being set to the initial value in a case in which the variable value is less than or equal to the first reference value X.

The receiving window may include a previous time period D1 and a subsequent time period D2 based on an expected reception time of the message, and increasing the initial value to the first value may include: increasing a first initial value A to a 1-1 value B and increasing a second initial value $\alpha$ to a 1-2 value $\beta$.

Increasing the initial value to the second value may include increasing the first initial value A to a 2-1 value C greater than the 1-1 value B and increasing the second initial value $\alpha$ to a 2-2 value $\gamma$ greater than the 1-2 value $\beta$.

The method may further include switching the UWB anchor device to a sleep mode in a case in which the variable value is greater than the third reference value Z.

In another general aspect, a UWB anchor device for adjusting a receiving window for waiting for reception of a message transmitted from a user terminal to perform UWB ranging includes: a communication unit configured to perform UWB communication with the user terminal; and a processor configured to count a number of reception failures of the message until the message is received; and perform the UWB ranging based on the length of the receiving window being set to the initial value or adjust the initial value, based on the number of reception failures of the message.

The receiving window may include a previous time period and a subsequent time period based on an expected reception time of the message, and the processor may be configured to increase a length value of the previous time period and the subsequent time period in proportion to the number of reception failures of the message.

The receiving window may include a previous time period and a subsequent time period based on an expected reception time of the message, and the processor may be configured to increase a length value of the previous time period and the subsequent time period by comparing the number of reception failures of the message with a plurality of reference values.

The processor may be configured to control an operation mode of the communication unit to a sleep mode in a case in which the number of reception failures of the message is greater than a largest reference value among the plurality of reference values.

In another general aspect, a UWB communication system for a vehicle including a plurality of UWB anchor devices installed in the vehicle and a user terminal performing UWB ranging by performing UWB communication with the plurality of UWB anchor devices, wherein each of the plurality of UWB anchor devices includes: a communication unit configured to perform UWB communication with the user terminal based on a receiving window set for waiting for reception of a message transmitted from the user terminal; and a processor configured to count a number of reception failures of the message until the message is received, and adjust a length of the receiving window in proportion the number of reception failures.

Since the UWB anchor consumes very large power (current) during an operation (transmission/reception), the receiving window cannot be increased blindly. In this limitation, the present invention may increase a success probability of UWB ranging and minimizing power (current) consumption by adjusting the receiving window of the UWB anchor according to the number of failures (time) of UWB ranging.

It is to be understood that both the foregoing general description and the following detailed description of the present invention are exemplary and explanatory and are intended to provide further explanation of the invention as claimed.

Other features and aspects will be apparent from the following detailed description, the drawings, and the claims.

DETAILED DESCRIPTION

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components. The present application, it should be understood that the term "connect" denotes a physical connection between elements described in the present specification and moreover includes an electrical connection and a network connection.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

Figure 1:
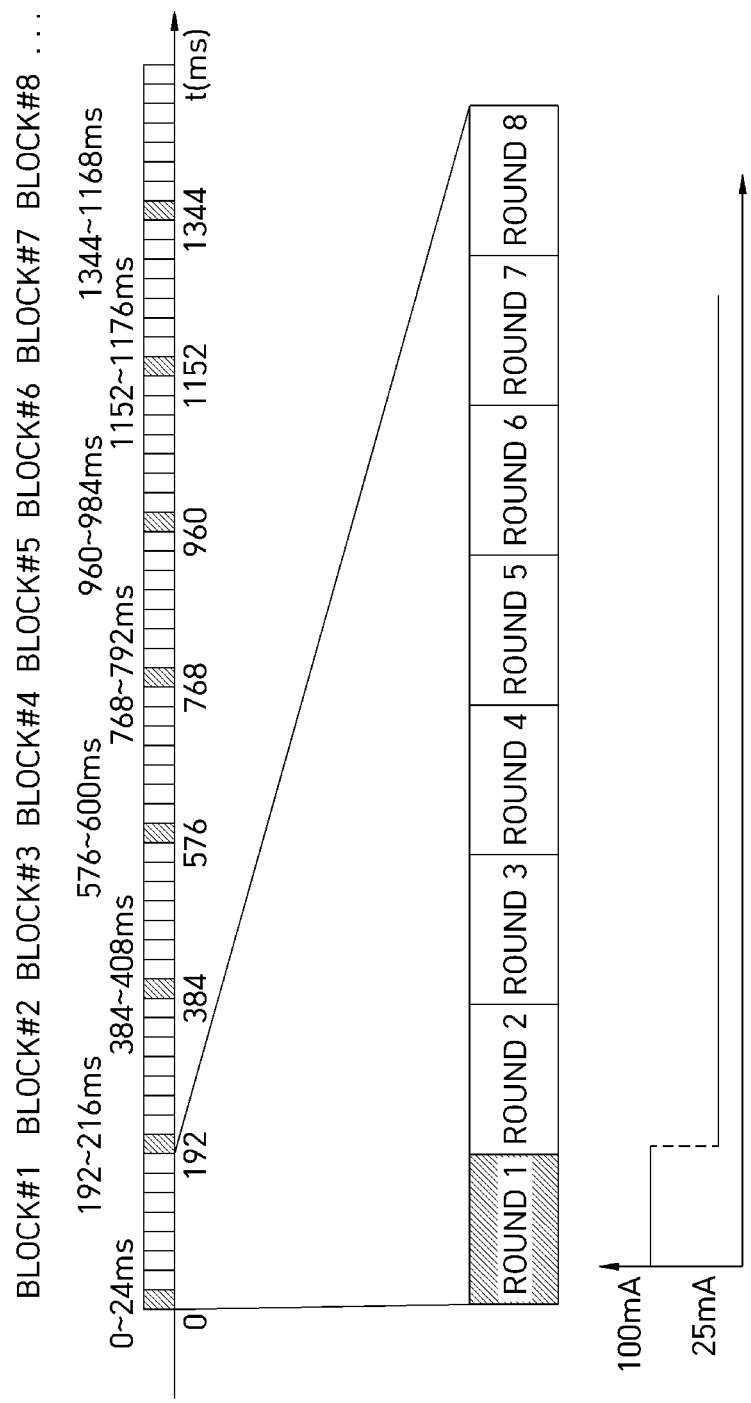
FIG. 1 is a diagram illustrating a frame structure based on UWB communication between a user terminal and UWB anchor(s) installed in a vehicle for UWB ranging that may be applied to the present invention.

FIG. 1 is a diagram illustrating a frame structure based on ultra-wide band (UWB) communication between a user terminal and UWB anchor(s) installed in a vehicle for UWB ranging that may be applied to the present invention.

Referring to FIG. 1, UWB ranging that may be applied to the present invention operates based on a plurality of ranging blocks (Block #1 to Block #8 . . . ).

Each ranging block represents a time frame for secure UWB ranging, and includes multiple ranging rounds (Round 1 to Round 8).

Each ranging round represents completion of an entire ranging event between the initiator(s) and responder(s) of a UWB network. In the present specification, the initiator may be a user terminal such as a smartphone that starts UWB ranging by transmitting a poll message. The responder(s) may be UWB anchor(s) installed in a vehicle responding to the poll message received from the initiator. Although not shown in FIG. 1, each ranging round may include a plurality of ranging slots.

The bottom of FIG. 1 is a graph showing current consumption of a UWB anchor for each ranging round, which shows current consumption when a UWB ranging operation is performed in a ranging round 1 (Round 1) and the UWB ranging operation is not performed in the remaining ranging rounds (Round 2 to Round) 8). As can be seen in the graph, in ranging round 1 (Round 1) in which UWB ranging operates, current consumption of about 100 mA or more occurs, and in ranging (Round 2 to Round 8) rounds in which UWB ranging does not operate, current consumption is about 25 mA occurs.

Figure 2:
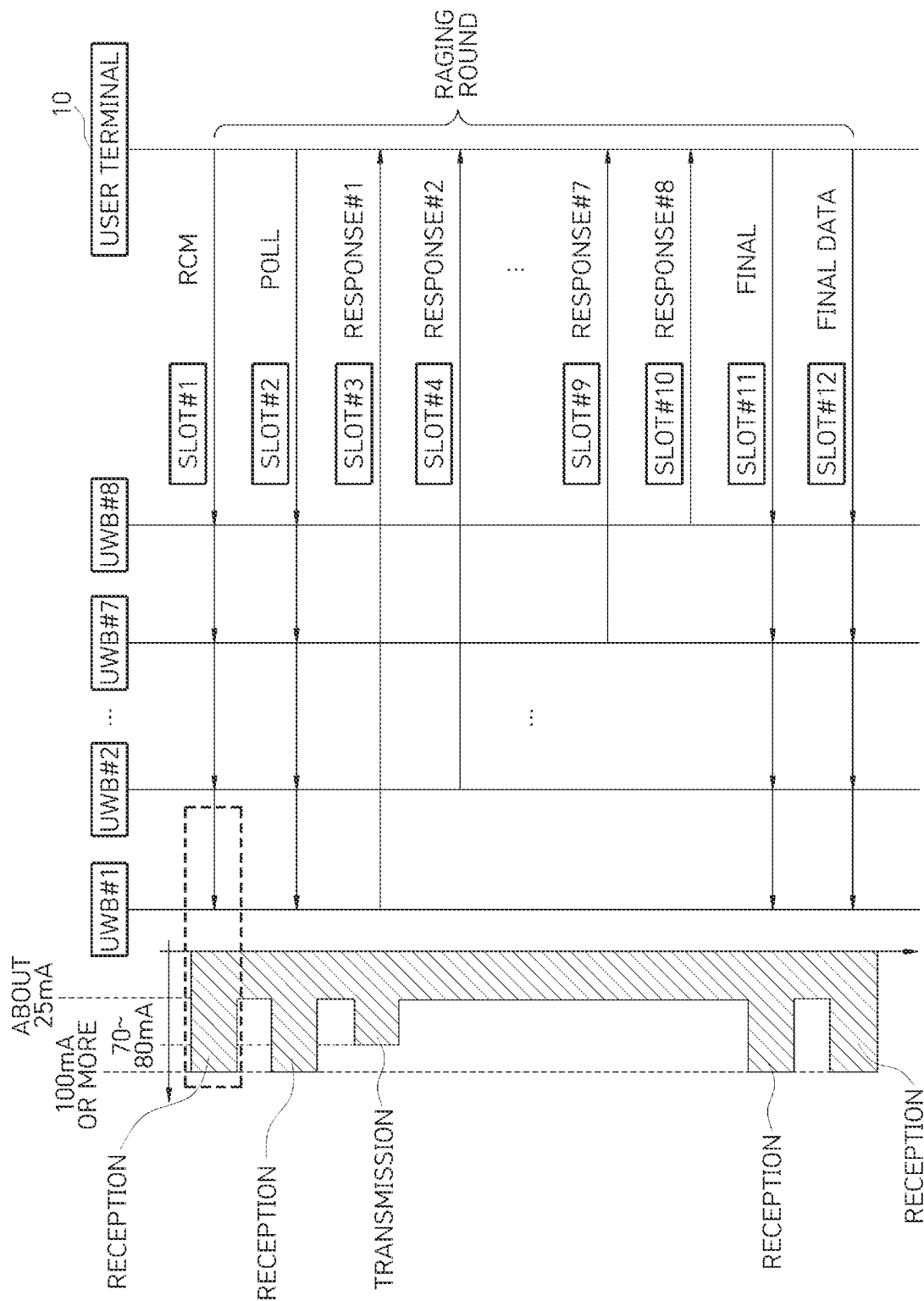
FIG. 2 is a diagram illustrating in detail current consumption generated based on one UWB anchor (UWB #1) in one ranging round shown in FIG. 1.

FIG. 2 is a diagram illustrating in detail current consumption generated based on one UWB anchor (UWB #1) in one ranging round shown in FIG. 1.

Referring to FIG. 2, when the vehicle is equipped with eight UWB anchors UWB #1 to UWB #8, the user terminal 10 and the eight UWB anchors UWB #1 to UWB #8 perform a ranging operation by exchanging messages (signals or information) respectively allocated to a plurality of ranging slots constituting one ranging round (Round 1), for example, twelve ranging slots SLOT #1 to SLOT #12.

A ranging control message (RCM) transmitted from the user terminal 10 to each of the UWB anchors UWB #1 to UWB #8 installed in the vehicle is allocated to the first ranging slot SLOT #1. The ranging control message (RCM) may be referred to as a pre-poll message and includes data for setting ranging parameters for starting UWB ranging. Data for setting the ranging parameters may include data related to, for example, a poll mode, a cast mode, a ranging mode, a minimum block length (duration) of a ranging block, a length (duration) of a ranging slot, a length (duration) of a ranging round, and the number of ranging rounds in one ranging block. The poll Mode specifies whether a device to which a poll message is transmitted is a controller or a controlee. Here, the controller is an initiator, and in this disclosure, a user terminal (e.g., a smartphone), and the controlee is a responder responding to the poll message received from the initiator, i.e., the user terminal, and in this disclosure, the UWB anchors (UWB #1 to UWB #8). The cast mode specifies unicast, multicast, broadcast, or many-2-many. The ranging mode specifies single-sided two-way ranging (SS-TWR) or double side (DS)-TWR.

The poll message transmitted from the user terminal 10 to each of the UWB anchors UWB #1 to UWB #8 installed in the vehicle are allocated to the second ranging slot SLOT #2. The poll message is a message for starting UWB ranging measurement.

First to eighth response messages Response #1 to Response #8 transmitted from the UWB anchors UWB #1 to UWB #8 to the user terminal 10 in response to the poll message are allocated to the third to tenth ranging slots SLOT #3 to SLOT #10, respectively.

The final message transmitted from the user terminal 10 to the UWB anchors UWB #1 to UWB #8 is allocated to the eleventh and twelfth ranging slots SLOT #11 and SLOT #12. When the user terminal 10 confirms reception of the first to eighth response messages Response #1 to Response #8 from all UWB anchors UWB #1 to UWB #8, the user terminal 10 generates a final message configured to include a time stamp of the response messages Response #1 to Response #8 and transmits the same to the UWB anchors UWB #1 to UWB #8. Then, the UWB anchors UWB #1 to UWB #8 calculate a distance to the user terminal 10 based on the time stamp included in each final message.

Meanwhile, referring to current consumption of the UWB anchor UWB #1 for each ranging slot within one ranging round, as shown in the graph 20 shown on the left of FIG. 2, current consumption (100 mA or more) is very large in the first, second, eleventh, and twelfth ranging slots SLOT #1, SLOT #2, SLOT #11, and SLOT #12 in which the messages RCM, POLL, and final are received from the user terminal 10, compared to current consumption (70 to 80 mA) in the first, second, eleventh, and twelfth ranging slots SLOT #1, SLOT #2, SLOT #11, SLOT #12 in which the messages RCM, POLL, and final are received from the user terminal 10 and in the third ranging slot SLOT #3 in which the response message Response #1 is transmitted to the user terminal 10.

A feature of the present invention is to increase a success probability of UWB ranging by adjusting the receiving window of the UWB anchor UWB #1. In order to increase the success probability of UWB ranging, it is preferable to increase a length (or duration) of the receiving window of the UWB anchor UWB #1, but, as described above, power (current) consumption of the UWB anchor UWB #1 in transmitting and receiving a message is very large, and thus, the receiving window cannot be increased blindly.

Figure 3:
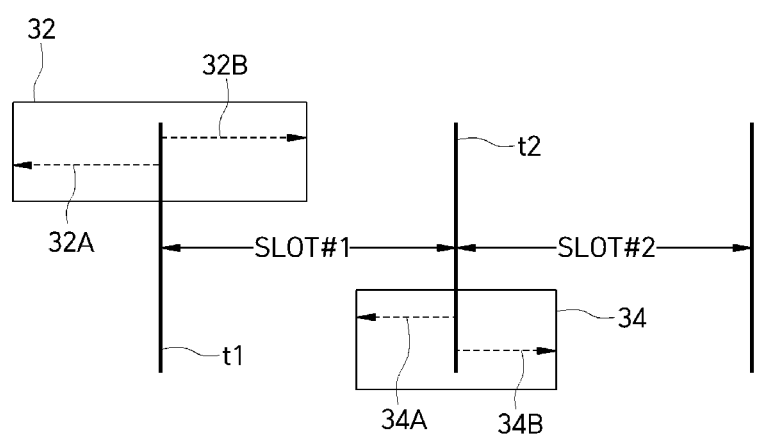
FIG. 3 is a conceptual diagram of a receiving window that may be applied to the present invention.

FIG. 3 is a conceptual diagram of a receiving window that may be applied to the present invention.

Referring to FIG. 3, the UWB anchor (UWB device) advances an opening time of the receiving window 32 by a previous time period 32A (e.g., 10 ms) and delays a closing time of the receiving window 32 by a subsequent time period 32B (e.g., 10 ms) based on an estimated reception time t1 to wait for the reception of the ranging control message (RCM) allocated to the ranging slots, for example, the ranging slot SLOT #1.

The reason for advancing the opening time and delaying the closing time of the receiving window 32 as described above is to overcome a time error that may occur due to a clock (CLK, operation clock) difference between the user terminal 10 and the UWB anchor.

For example, if a clock of the smartphone that performs the UWB ranging operation once every 500 ms is +1000 ppm and a clock of the UWB anchor is −1000 ppm, a difference of 2000 ppm (=1 ms) occurs per 500 ms, so a duration for which UWB ranging may be continued varies according to a length of the receiving window.

In the above example, assuming that the receiving window 32 has a length (duration) of 20 ms in which the previous time period 32A is set to 10 ms and the subsequent time period 32B is set to 10 ms, UWB ranging may be continuously performed 20 times for 500 ms each.

As a result, UWB ranging may be performed for a longer period of time as the previous time period 32A and the subsequent time period 32B are increased, but on the contrary, the power (current) consumption increases as much as a time for which the receiving window is open, and thus, it is necessary to select an appropriate midpoint.

Meanwhile, in FIG. 3, t2 indicates an estimated reception time of the poll message, and 34A and 34b indicate a length of the receiving window 34 for the poll message (extended) based on the estimated reception time t2.

Figure 4:
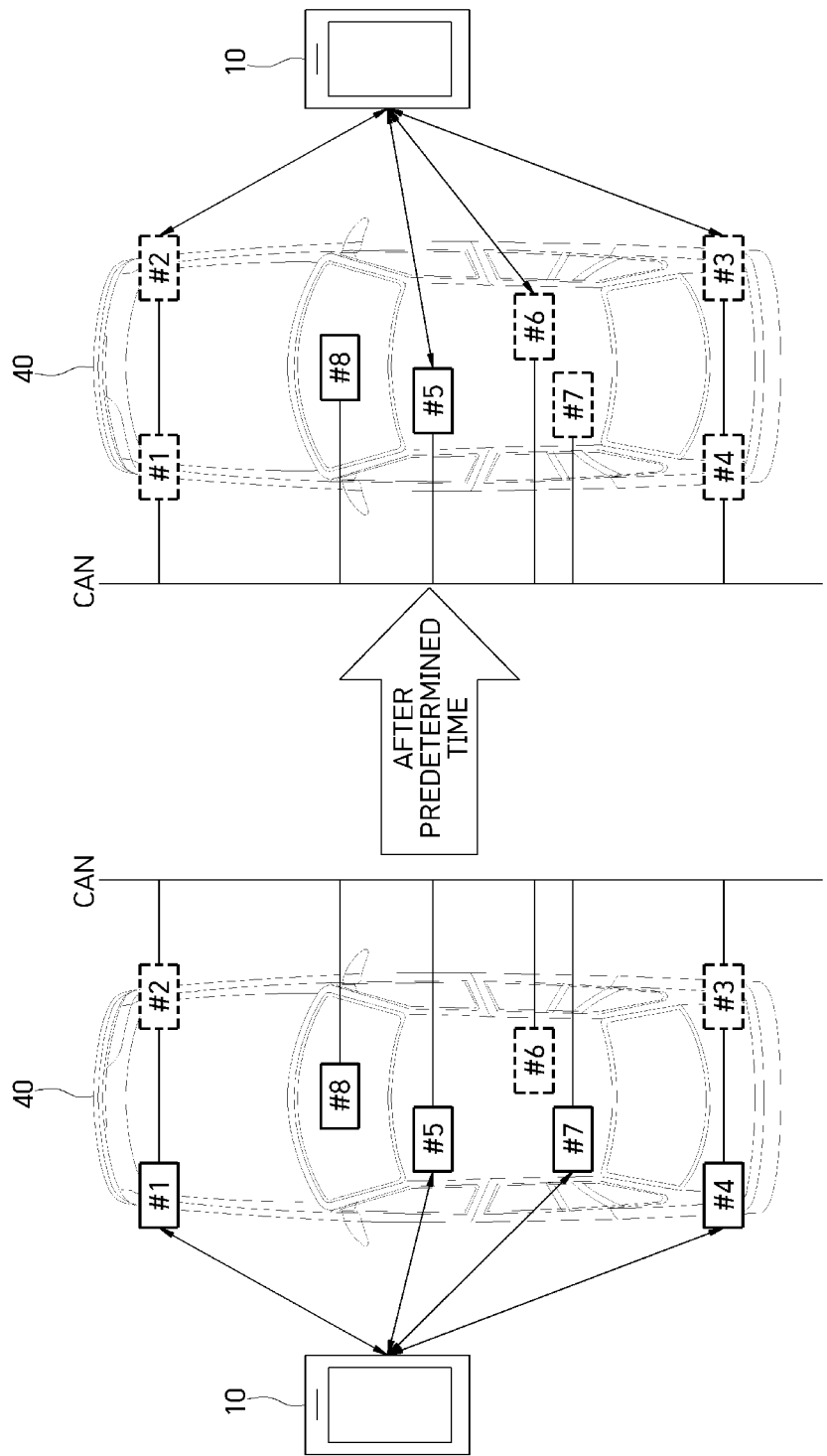
FIG. 4 is a diagram illustrating a case of failure of a UWB ranging operation due to a clock difference between a user terminal and a UWB anchor in order to help the understanding of the present invention.

FIG. 4 is a diagram illustrating a case of failure of a UWB ranging operation due to a clock difference between a user terminal and a UWB anchor in order to help the understanding of the present invention.

Referring to FIG. 4, when the user terminal 10 is located on the left side of a vehicle 40 as shown on the left, since there is no obstacle between the user terminal 10 and the UWB anchors #1, #4, #5, and #7 installed on the left portion of the vehicle 40, smooth UWB communication may be performed. However, in the case of the UWB anchors #2, #3, and #6 installed on the right portion of the vehicle 40, a vehicle body of the vehicle 40 may act as an obstacle, increasing a probability of failing UWB communication.

On the left of FIG. 4, the UWB anchors #2, #3, and #6 are on standby for operation, but when a signal such as the ranging control message (RCM) is not continuously received at an actually estimated time, time errors between the UWB anchors #2, #3, and #6 and the user terminal 10 due to a clock CLK difference between the UWB anchors #2, #3, and #6 and the user terminal 10 are accumulated.

In the example of FIG. 3, if the UWB anchors #2, #3, and #6 fail UWB ranging 20 times by 500 ms, after a certain time (after 10 seconds), UWB ranging cannot be successful even if the user terminal 10 enters an area in which wireless communication with the UWB anchors #2, #3, and #6 is possible As shown on the right side of FIG. 4. Even if the UWB operation of UWB anchor #5 succeeds, if most of the UWB anchors #1, #2, #3, #4, #5, #6, and #7 fail to perform UWB ranging, only power consumption occurs.

The table below shows results of time for returning to normal even if UWB ranging continuously fails when a previous period and a subsequent period are 2 ms/2 ms, 5 ms/5 ms, and 10 ms/10 ms based on an estimated reception time indicating a length of the receiving window, measured through an actual experiment.

TABLE 1

| Test Case | Time | | | | | | | | | |
|---|---|---|---|---|---|---|---|---|---|---|
| | 1 Min. | 2 Min. | 3 Min. | 4 Min. | 5 Min. | 6 Min. | 7 Min. | 8 Min. | 9 Min. | 10 Min. |
| 2 ms/2 ms | OK | NG | NG | NG | NG | NG | NG | NG | NG | NG |
| 5 ms/5 ms | OK | OK | NG | NG | NG | NG | NG | NG | NG | NG |
| 10 ms/10 ms | OK | OK | OK | OK | OK | NG | NG | NG | NG | NG |

Figure 5:
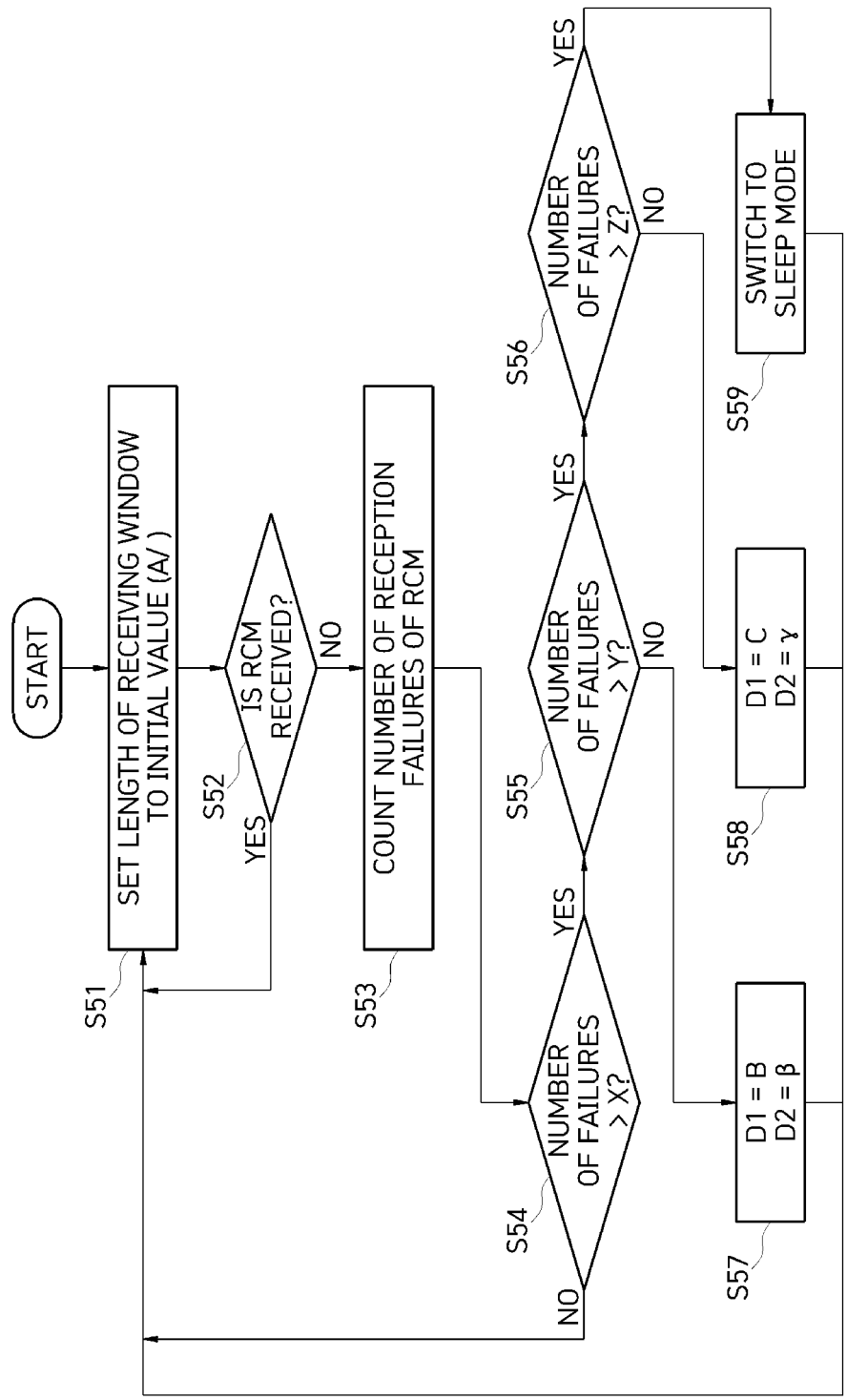
FIG. 5 is a flowchart illustrating a method of adjusting a receiving window of a UWB anchor (UWB device) for reducing current consumption according to UWB ranging and increasing a success probability of UWB ranging according to an embodiment of the present invention.

FIG. 5 is a flowchart illustrating a method of adjusting a receiving window of a UWB anchor (UWB device) for reducing current consumption according to UWB ranging and increasing a success probability of UWB ranging according to an embodiment of the present invention.

A subject performing each of the steps below may be a UWB anchor or a processor (at least one CPU or a microcontroller unit designed to include at least one CPU) mounted in the UWB anchor.

Referring to FIG. 5, first, in step S51, a process of setting a length (or duration) of the receiving window to an initial value is performed.

The length of the receiving window includes a previous time interval D1 and a subsequent time interval D2 based on the estimated reception time of the ranging control message (RCM) received from the user terminal. In the initial value setting, the previous time period D1 is set to an initial value 'A', and the subsequent time period D2 is set to 'α'.

Next, in step S52, it is determined whether a ranging control message (RCM) is received. When the ranging control message (RCM) is received, the process returns to step S51 and the UWB ranging operation is continuously performed based on the length of the receiving window set to the initial values (A, α).

In step S53, if the ranging control message (RCM) is not received, the number of reception failure of the ranging control message (RCM) is counted once, and a variable value MaxRRCNT++ indicating the number of reception failure of the ranging control message (RCM)) is incremented by 1.

Next, in step S54, the variable value MaxRRCNT++ counted so far is compared with a first reference value X to determine whether the variable value MaxRRCNT++ is greater than the first reference value X. If the variable value MaxRRCNT++ counted so far is less than or equal to the first reference value X, the UWB ranging operation is continuously performed based on the length of the receiving window set to the initial values (A, α) in step S51.

Next, in step S55, when the variable value MaxRRCNT++ is greater than the first reference value X, it is determined whether the variable value MaxRRCNT++ is greater than a second reference value Y. Here, the second reference value Y is set to be larger than the first reference value X.

If the variable value MaxRRCNT++ is less than or equal to the second reference value Y, the process proceeds to step S57 and increases the initial value A of the previous time interval D1 indicating the length of the receiving window in step S57 to B, and then increases the initial value α of the time interval D2 to β.

If the variable value MaxRRCNT++ is greater than the second reference value Y, the process proceeds to step S56 and it is determined whether the variable value MaxRRCNT++ is greater than a third reference value Z in step S56. Here, the third reference value Z is set to be larger than the second reference value Y.

If the variable value MaxRRCNT++ is less than or equal to the third reference value Z, the process proceeds to S58 and the initial value A of the previous time period D1 indicating the length of the receiving window is increased to C (C>B>A) and the initial value α of the time interval D2 is increased to γ (γ>β>α) in step S58.

As described above, in the present invention, an increase in the variable value MaxRRCNT++ indicating the number of failures of the ranging control message (RCM) reception means that a failure time of the UWB ranging operation is increased, and thus, an operation success probability of UWB ranging is increased by increasing the lengths (D1 and D2) of the receiving window to be proportional to the failure time.

Meanwhile, as described above, since the amount of power (current) consumption increases as much as a time for which the receiving window is open, it is necessary to appropriately limit the increase in the length of the receiving window. Accordingly, in an embodiment of the present invention, when the variable value MaxRRCNT++ is greater than the third reference value Z, that is, when UWB ranging continuously fails for a time corresponding to the third reference value Z, the UWB anchor is switched to a sleep mode in step S59. Here, the third reference value Z may be a value calculated through an experiment in consideration of a trade-off relationship between current consumption and the length of the receiving window.

Figure 6:
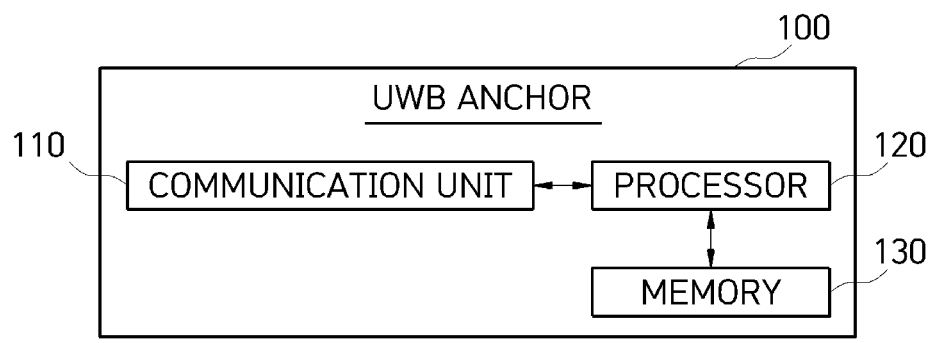
FIG. 6 is a block diagram of a UWB anchor device for implementing a method for adjusting a receiving window according to an embodiment of the present invention.

FIG. 6 is a block diagram of a UWB anchor device for implementing a method for adjusting a receiving window according to an embodiment of the present invention.

Referring to FIG. 6, the UWB anchor device (or UWB device) 100 according to an embodiment may be one of a plurality of UWB anchors installed in a vehicle and may be a device that performs UWB ranging by performing UWB communication with the user terminal.

The UWB anchor device 100 may include a communication unit 110, a processor 120, and a memory 130, but the UWB anchor 100 may be implemented by more components than these components.

FIG. 6 illustrates that the UWB anchor device 100 includes one processor, but the embodiment is not limited thereto and the UWB anchor 100 may include a plurality of processors. At least some of the operations and functions of the processor 120 described below may be performed by a plurality of processors.

The UWB anchor device 100 illustrated in FIG. 6 may perform a method of adjusting a receiving window according to various embodiments of the present disclosure, and in particular, the descriptions of FIG. 5 may be applied. Therefore, redundant contents are omitted.

The communication unit 110 may perform UWB communication and/or near field communication (NFC) communication with the user terminal such as a smartphone under the control of the processor 120. Above all, the communication unit 110 may receive various messages, for example, ranging control message (RCM), a poll message, a final message, and the like, from the user terminal to perform UWB ranging based on the length of the receiving window adjusted under the control of the processor 120.

To this end, the communication unit 110 may include a communication module supporting at least one of various UWB communication methods. For example, the communication module may be in the form of a chipset or may include at least one of NFCs.

The processor 120 may control an overall operation of the UWB anchor device 100, and may include at least one processor such as a CPU or GPU. The processor 120 may control other components included in the UWB anchor device 100 to perform UWB ranging. For example, the processor 120 may control the length of the receiving window of the communication unit 110.

The memory 130 may store a program for processing and control of the processor 120, and may store data input to the UWB anchor 100 or output from the UWB anchor device 100.

The processor 120 may perform UWB ranging with the user terminal in a ranging round among a plurality of ranging rounds included in a ranging block.

In order to adjust the receiving window of the communication unit 110, the processor 120 may perform an operation of setting the length of the receiving window to an initial value, determining whether a ranging control message RCM is received through the communication unit 110, designating the number of reception failures accumulated by counting the number of reception failures of the ranging control message (RCM) to a specific variable value MaxRRCNT++ and storing the specific variable value MaxRRCNT++ in the memory 130, adjusting the length of the receiving window comparing condition values previously set for adjusting the length of the receiving window, for example, a plurality of reference values X, Y, and Z with the specific variable value MaxRRCNT++ or by increasing the initial value indicating the length of the receiving window to another value based on a result of comparison between the plurality of reference values X, Y, and Z and the specific variable value MaxRRCNT++, switching the communication unit 110 to a sleep mode, and the like.

While the present invention has been described in connection with exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for an ultra-wide band (UWB) anchor device for adjusting a receiving window for waiting to receive a message transmitted from a user terminal to perform UWB ranging, the method comprising:
   setting a length of the receiving window to an initial value;
   counting a number of reception failures of the message until the message is received; and
   performing the UWB ranging based on the length of the receiving window being set to the initial value or adjusting the initial value, based on the number of reception failures,
   wherein in response to the number of reception failures is greater than an threshold number, the UWB anchor device is switched into a sleep mode.

2. The method of claim 1, wherein counting the number of reception failures of the message includes counting a number of reception failures of a ranging control message (RCM) for setting a ranging parameter for starting the UWB ranging.

3. The method of claim 1, wherein adjusting the initial value based on the number of reception failures includes increasing the initial value in proportion to the number of reception failures.

4. The method of claim 1, wherein
   the receiving window includes a previous time period and a subsequent time period based on an expected reception time of the message, and
   adjusting the initial value based on the number of reception failures includes increasing initial values of the previous time period and the subsequent time period in proportion to the number of reception failures.

5. The method of claim 1, wherein adjusting the initial value based on the number of reception failures includes comparing a variable value indicating the number of reception failures with a plurality of reference values by stages and increasing the initial value by stages.

6. The method of claim 5, wherein
   adjusting the initial value based on the number of reception failures includes:
   increasing the initial value to a first value in a case in which the variable value is greater than a first reference value X and equal to or less than a second reference value Y; and
   increasing the initial value to a second value greater than the first value in a case in which the variable value is greater than the second reference value Y and equal to or less than a third reference value Z greater than the second reference value Y.

7. The method of claim 6, further comprising performing the UWB ranging by performing UWB communication with the user terminal based on the receiving window being set to the initial value in a case in which the variable value is less than or equal to the first reference value X.

8. The method of claim 6, wherein the receiving window includes a previous time period D1 and a subsequent time period D2 based on an expected reception time of the message, and increasing the initial value to the first value includes increasing a first initial value A to a 1-1 value B and increasing a second initial value α to a 1-2 value β.

9. The method of claim 8, wherein increasing the initial value to the second value includes increasing the first initial value A to a 2-1 value C greater than the 1-1 value B and increasing the second initial value α to a 2-2 value γ greater than the 1-2 value β.

10. The method of claim 6, further comprising switching the UWB anchor device to a sleep mode in a case in which the variable value is greater than the third reference value Z.

11. An ultra-wide band (UWB) anchor device for adjusting a receiving window for waiting for reception of a message transmitted from a user terminal to perform UWB ranging, the UWB anchor device comprising:
   a communication unit configured to perform UWB communication with the user terminal; and
   a processor configured to:

count a number of reception failures of the message until the message is received; and perform the UWB ranging based on the length of the receiving window being set to the initial value or adjust the initial value, based on the number of reception failures of the message, wherein in response to the number of reception failures is greater than a threshold number, the UWB anchor device is switched into a sleep mode.

12. The UWB anchor device of claim 11, wherein the receiving window includes a previous time period and a subsequent time period based on an expected reception time of the message, and the processor is configured to increase a length value of the previous time period and the subsequent time period in proportion to the number of reception failures of the message.

13. The UWB anchor device of claim 11, wherein the receiving window includes a previous time period and a subsequent time period based on an expected reception time of the message, and the processor is configured to increase a length value of the previous time period and the subsequent time period by comparing the number of reception failures of the message with a plurality of reference values.

14. The UWB anchor device of claim 13, wherein the processor is configured to control an operation mode of the communication unit to a sleep mode in a case in which the number of reception failures of the message is greater than a largest reference value among the plurality of reference values.

15. An ultra-wide band (UWB) communication system for a vehicle including a plurality of UWB anchor devices installed in the vehicle and a user terminal performing UWB ranging by performing UWB communication with the plurality of UWB anchor devices, wherein each of the plurality of UWB anchor devices includes:

a communication unit configured to perform UWB communication with the user terminal based on a receiving window for waiting for reception of a message transmitted from the user terminal; and a processor configured to count a number of reception failures of the message until the message is received, and adjust a length of the receiving window in proportion the number of reception failures, wherein in response to the number of reception failures is greater than a threshold number, the UWB anchor devices are switched into a sleep mode.

* * * * *